United States Patent [19]

Morrison et al.

[11] 3,894,284

[45] July 8, 1975

[54] CURRENT FLOW TEST APPARATUS

[75] Inventors: Ralph Morrison, Pasadena; Orrin B. O'Dea, Garden Grove, both of Calif.

[73] Assignee: Communication Mfg. Co., Long Beach, Calif.

[22] Filed: Apr. 29, 1974

[21] Appl. No.: 465,350

[52] U.S. Cl. .................................. 324/28 R; 178/69
[51] Int. Cl. ............................................ G01r 31/02
[58] Field of Search ......... 324/28; 178/69; 179/175; 317/148.5

[56] References Cited
UNITED STATES PATENTS

| | | | |
|---|---|---|---|
| 2,478,945 | 8/1949 | Rose | 324/28 R |
| 2,478,946 | 8/1949 | Rose | 324/28 R |
| 3,217,243 | 11/1965 | Franklin | 324/28 R |
| 3,355,659 | 11/1967 | Burgess | 324/28 R |
| 3,678,372 | 7/1972 | Elder | 324/28 |

*Primary Examiner*—Alfred E. Smith
*Assistant Examiner*—Michael J. Tokar
*Attorney, Agent, or Firm*—Christie, Parker & Hale

[57] ABSTRACT

The current flow test apparatus has a test connector with first and second test terminal connectors. A power connector has first and second power terminal connectors, a transistorized active current regulating circuit has a power supply input for receiving power, first and second signal input/output circuits and a reference input. The regulating circuit responds to the level of signal at the reference input for regulating proportionately the level of current passing between the input/output circuits of the regulating circuit. Manually adjustable potentiometers set the signal at the reference input to various levels. A power supply has first and second input circuits, respectively, connected to the first and second power terminal connectors for receiving power and an output circuit coupled to the power supply input of the regulating circuit. The power supply provides electrical power to the regulating circuit and significantly includes a transformer for providing a D.C. isolation between the output and input circuits of the power supply. Manually operable mode switching circuits selectively couple the first and second input/output circuits of the current regulating circuit, separately, to the first and second test terminal connectors and to the first and second power terminal connectors, in various combinations. A visual indicator indicates the current passing between the first and second input/output circuits of the current regulating circuit.

15 Claims, 17 Drawing Figures

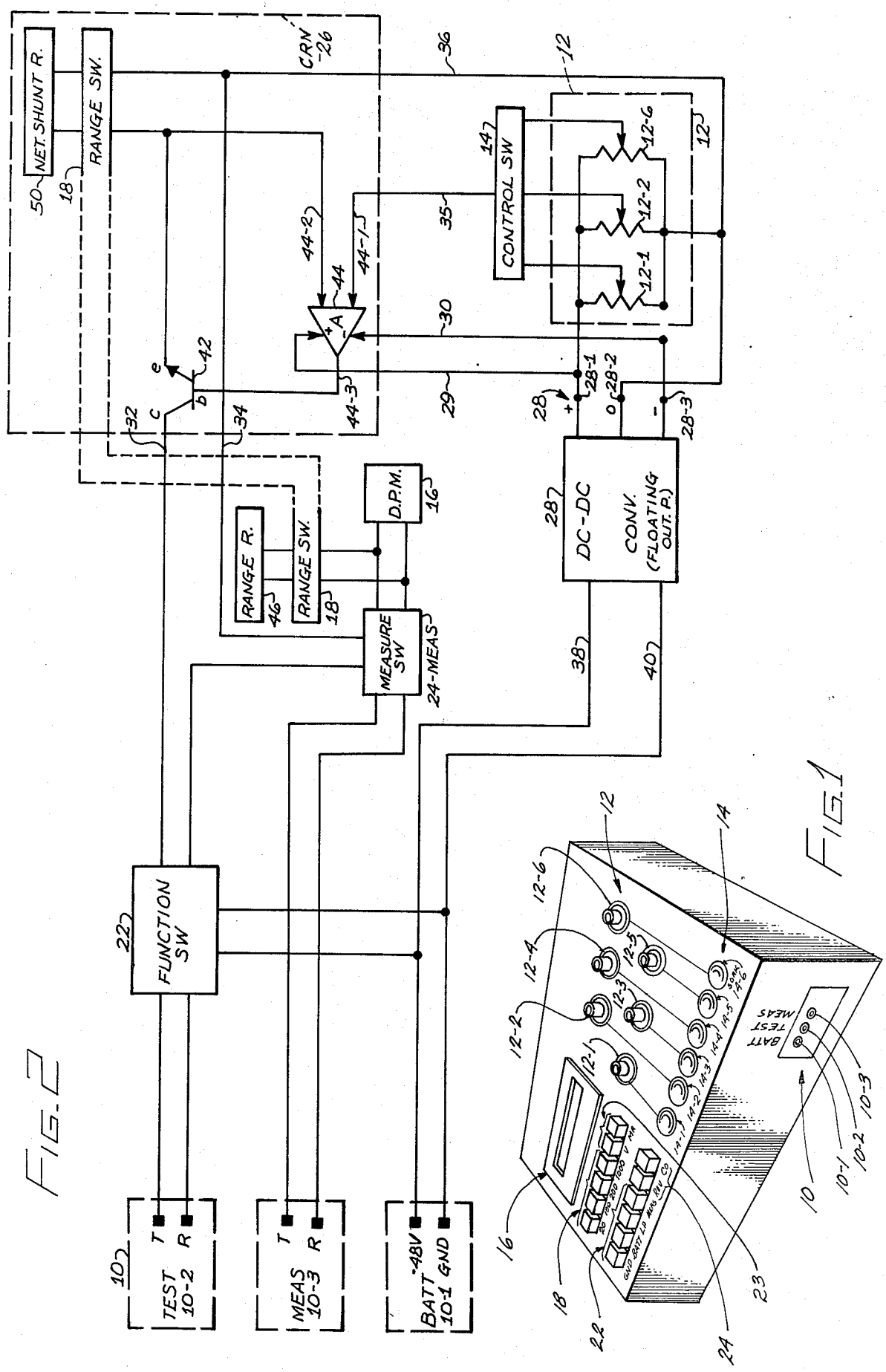

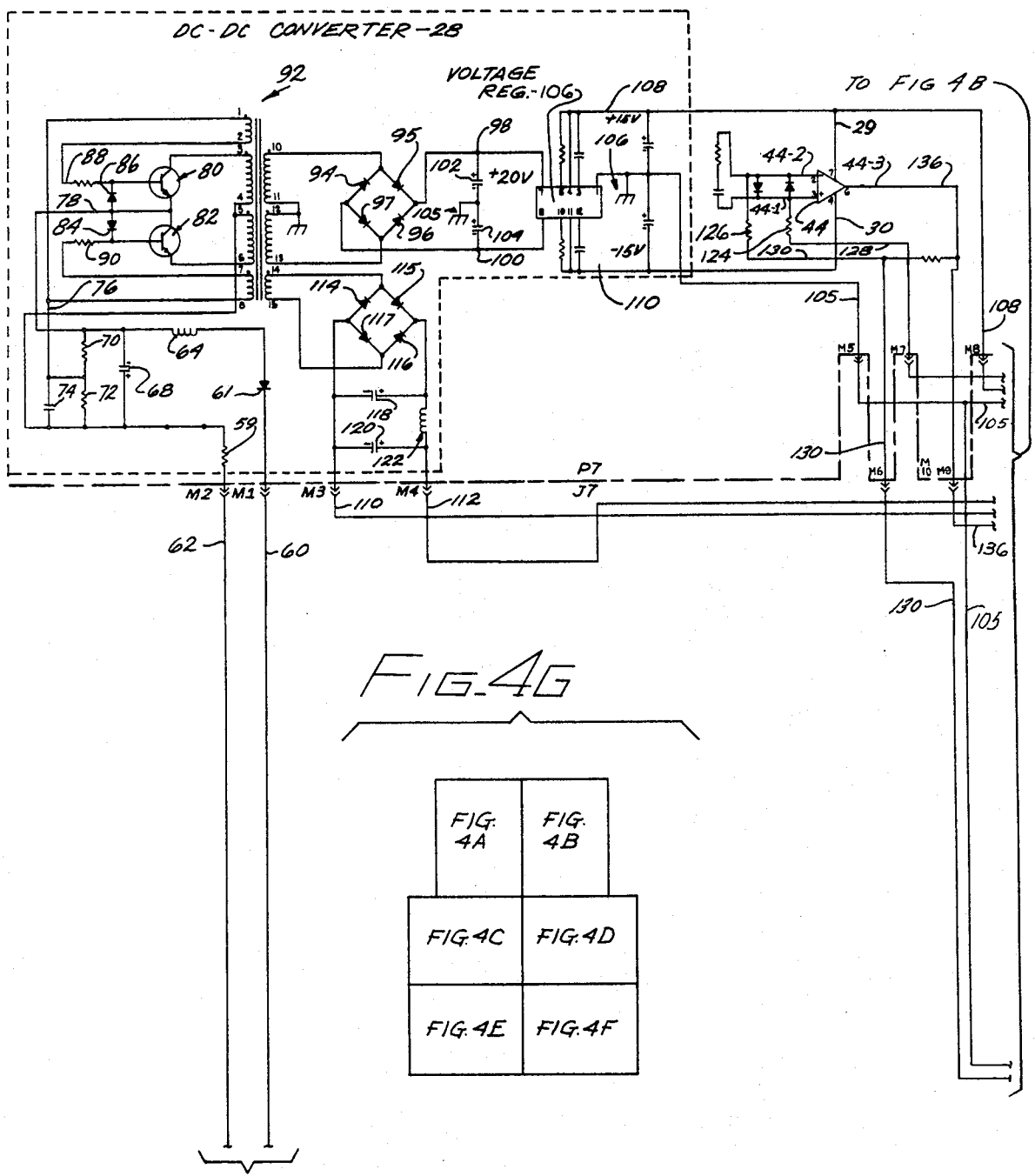

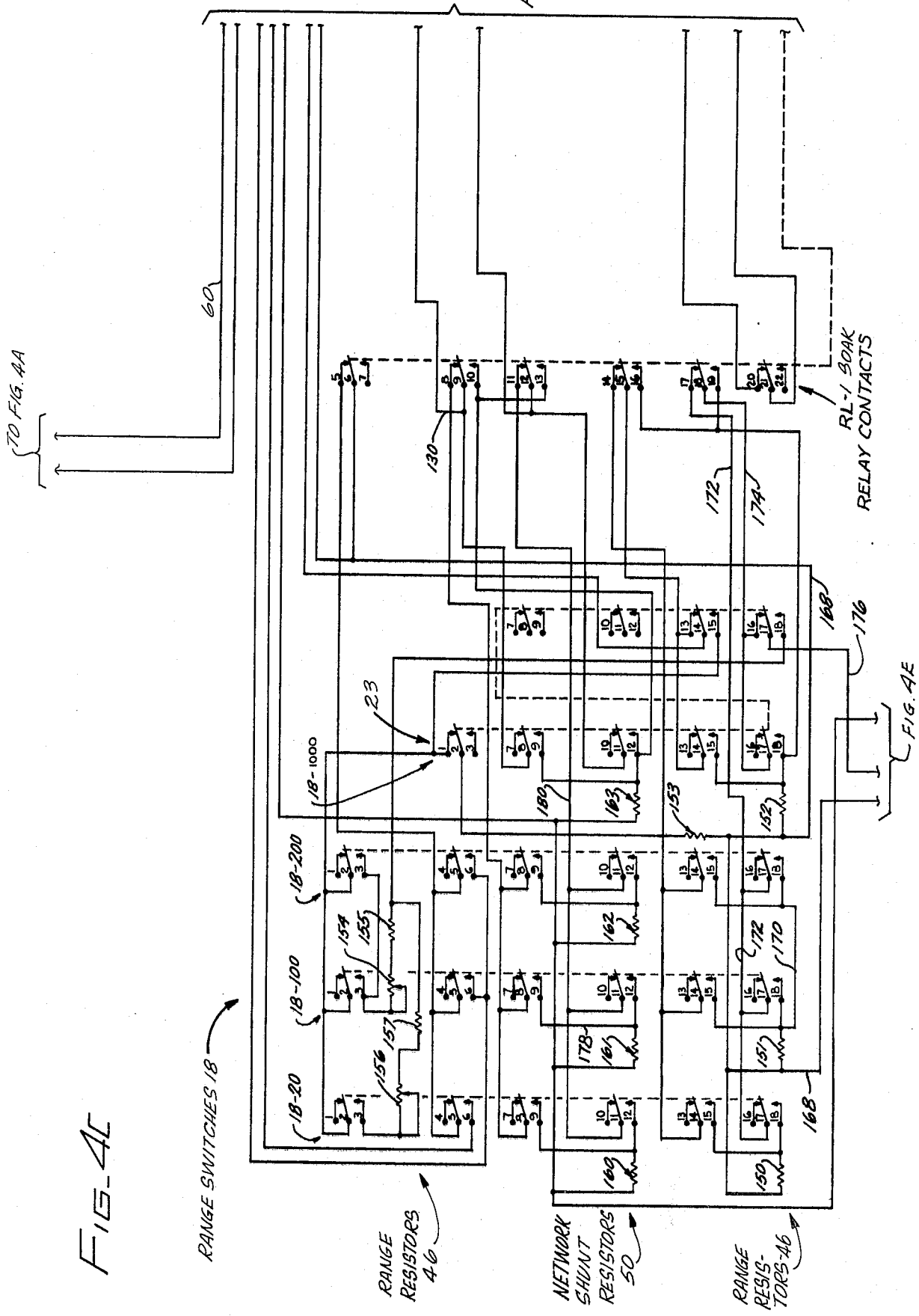

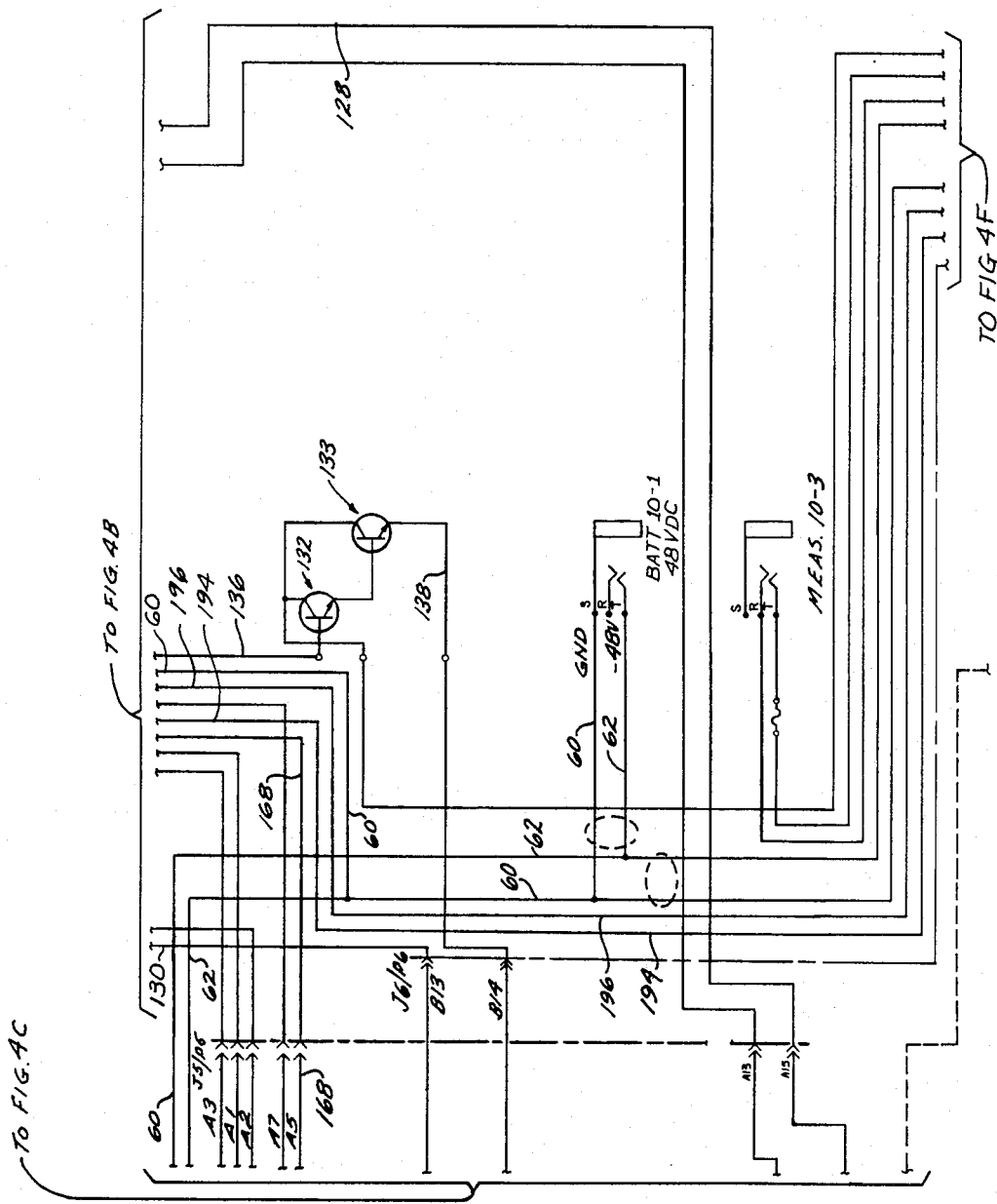

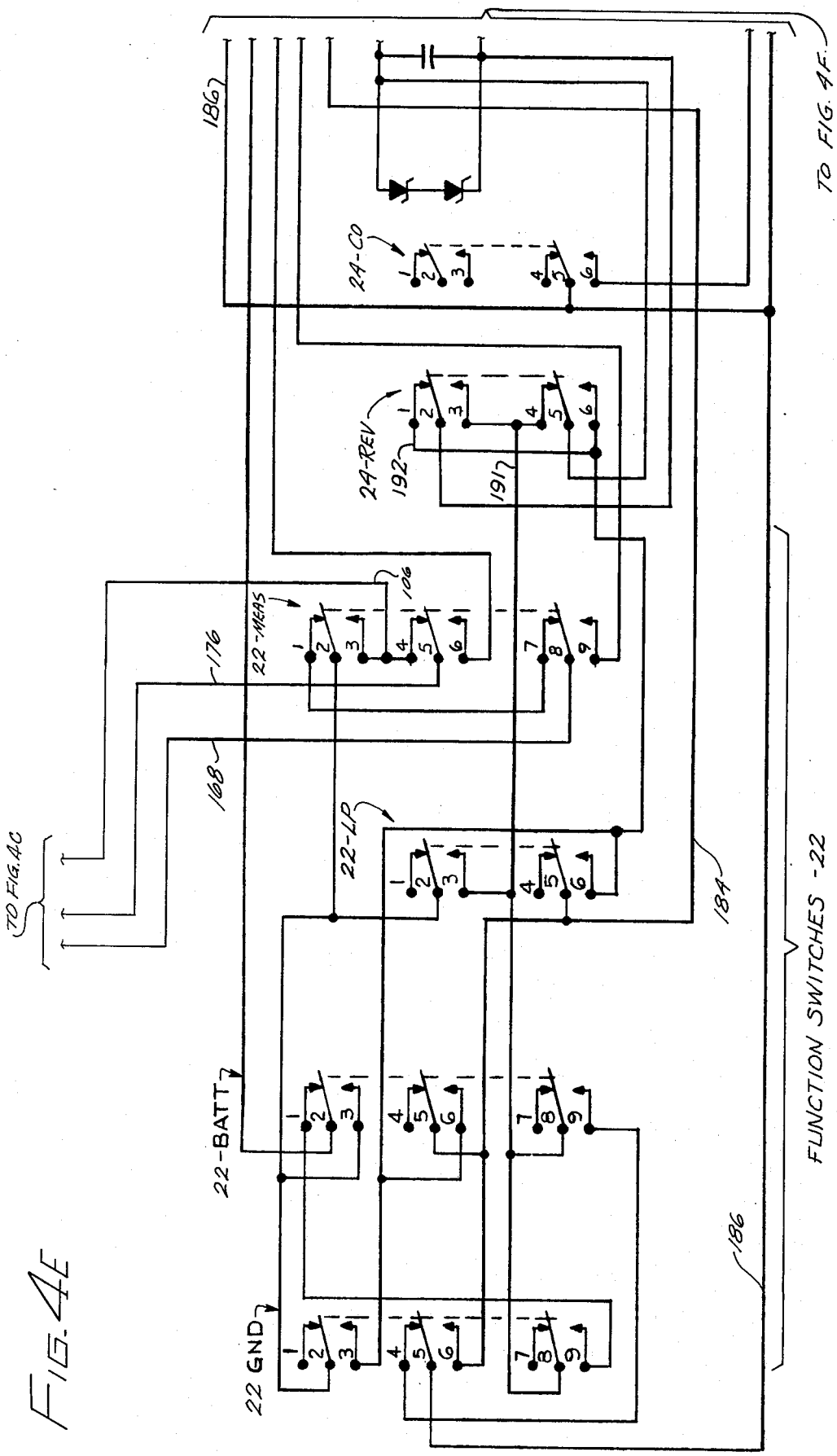

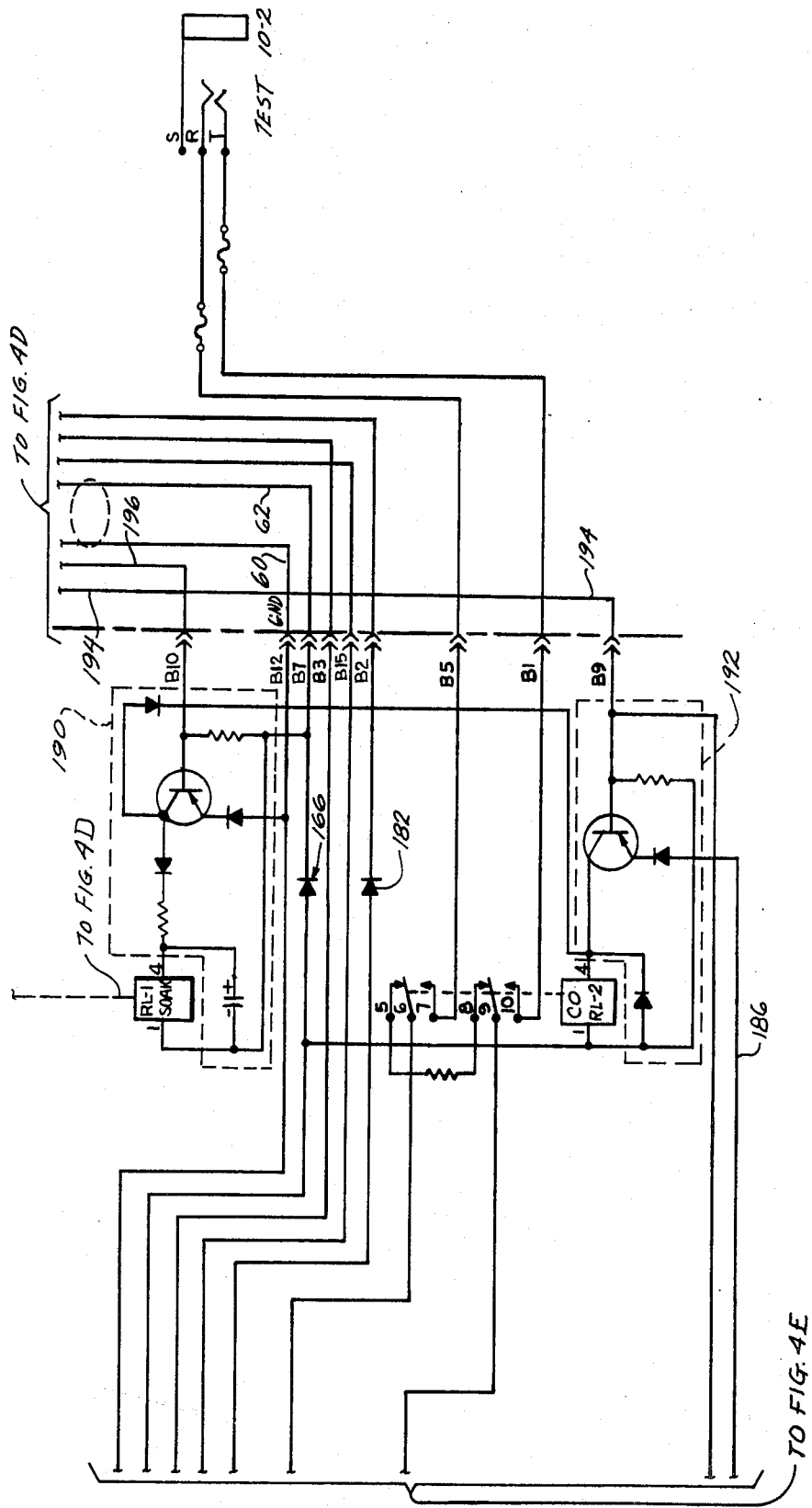

MA, GND., AND A RANGE SWITCH DEPRESSED.

MA, BATT, AND A RANGE SWITCH DEPRESSED.

MA, LP, AND A RANGE SWITCH DEPRESSED

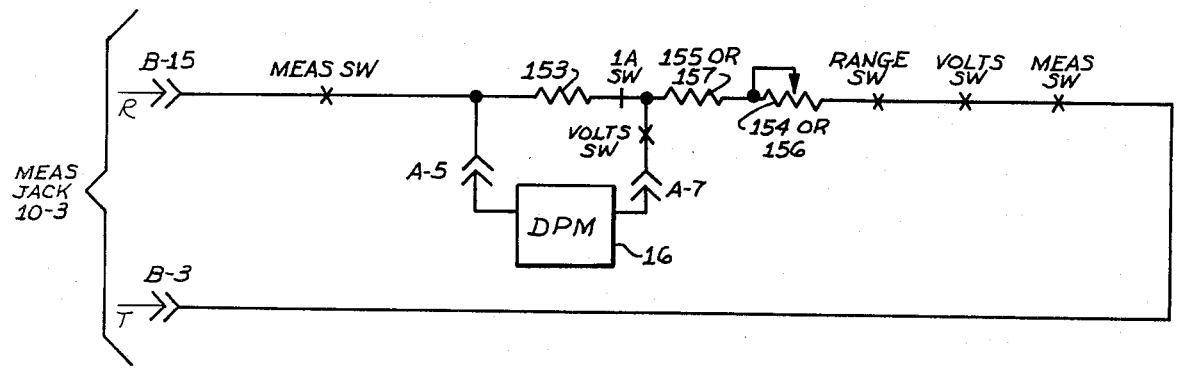
Fig. 5D
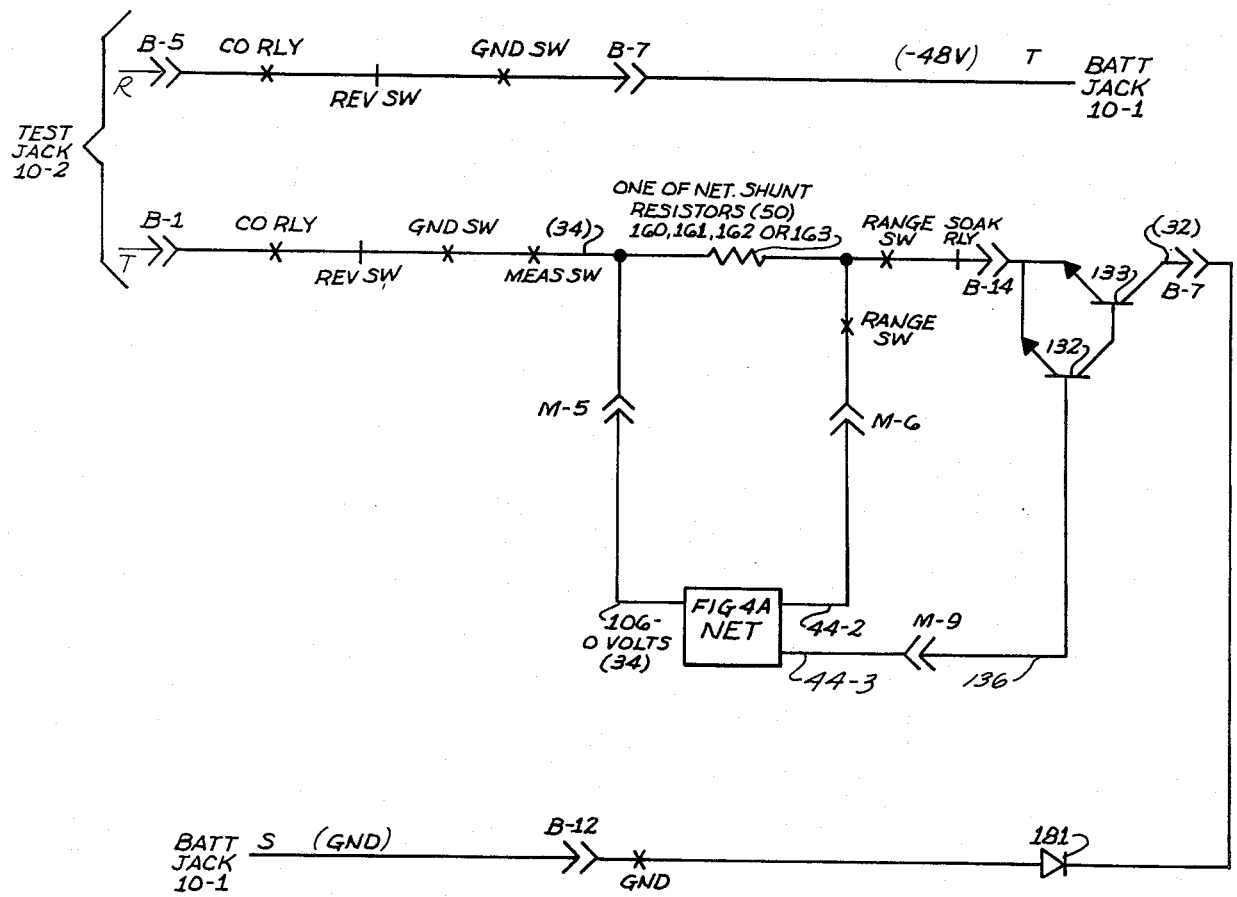

CURRENT FLOW TEST APPARATUS

BACKGROUND OF THE INVENTION

This invention relates to current flow test apparatus and, more particularly, to test apparatus for regulating the current through and indicating the resultant current passing through an external electrical circuit.

Current flow test apparatus are known for regulating and measuring current passing through electrical circuits such as relays. A particular type of current flow test set is used in the telephone industry where central office battery is used as the source of power, both for the current flow test set and for the relay under test. The principle elements of such a current flow test set are a milliammeter and an adjustable resistance circuit connected in series. The adjustable resistance circuit regulates the amount of current passing through the relay under test. Additionally, keys and switches set up the required circuit arrangements between the adjustable resistance circuit, the supply battery and the relay under test.

Such current flow test sets are often not as accurate as desirable for testing the relays and stability of the test leaves much to be desired. Additionally, the current through the relay under test varies with changes in resistance of the relay under test. For example, a relay will heat up due to current passed through its coil, causing the coil resistance to change. As a result, current supplied by the test set varies, resulting in inaccurate test results.

It is desirable to adjust the amount of current and measure the current passing through the relay for pull in and drop out current values. Further, it is important to determine the operating margins of the relays, however, it is very difficult to do this with the above-mentioned prior art device due to the inability to accurately control the amount of current supplied to the relay coil.

Such a prior art device is known as the 35-type test set SD-96003-01 (J94714A) and SD-95410-01 (J94714B) disclosed in the Bell Systems Practices Manual, Section 100-101-101, Issue 6, Jan. 1962, published by American Telephone and Telegraph Company.

SUMMARY OF THE INVENTION

Briefly, an embodiment of the present invention is in a current flow test apparatus and includes first and second input/output circuits for the test apparatus, and first and second power input circuits for the test apparatus. Significantly, an active current regulating circuit is provided and has a power supply input for receiving power, first and second signal input/output circuits, and a reference input. The regulating circuit has a D.C. signal isolation from the power input circuits and is operative for regulating the level of current passing between the input/output circuits of the regulating circuit to a constant level corresponding to the level of the signal applied at the reference input. By virtue of this arrangement, a relay coil or other circuit can be connected in between the first and second current input/output circuits for the test apparatus and the active current regulating circuit will maintain the current to the relay coil or other circuit constant regardless of change in resistance of the relay or circuit under test.

Additionally, a power supply is provided in the test apparatus having first and second input circuits, respectively, connected to the first and second power input circuits for receiving power and an output circuit coupled to the power supply input of the regulating circuit. The power supply provides electrical power for the regulating circuit. Significantly, the power supply has a circuit such as a transformer for providing D.C. signal isolation between the output and input circuits of the power supply. This arrangement is quite important as it now permits the voltage in the active current regulating circuit to float relative to the central office battery and ground, therefore accommodating different relay circuit configurations.

When testing telephone relays, several different circuit configurations must normally be accommodated by the current flow test set. Examples of these circuit conditions are as follows:

1. The relay under test has neither battery nor ground connected to its windings;
2. The relay under test has one side of its winding connected to telephone central office ground and the other side open;
3. The relay under test has one side of its winding connected to telephone central office battery; and
4. The relay under test is a differential relay with two windings, one side of one winding being connected to central office battery and one side of the other relay being connected to telephone central office ground.

Significantly, it is important that all of these possible relay circuit configurations be both tested and current therethrough measured to determine pull in and drop out characteristics. Accordingly, the D.C. signal isolation between the input of the power supply and the power output to the active current regulating circuit is significant in permitting the aforementioned configurations to be tested.

Also included in the current flow test apparatus is manually operable function switching means for selectively coupling the first and second input/output circuits of the regulating circuit, separately, to the first and second power input circuits and the first and second current input/output circuits of the test apparatus and in various combinations. Thus, the same source of central office battery is used for operating the current flow test set and the relay under test.

A manually adjustable means is provided for setting the signal at the reference input of the regulating circuit to various levels. A visual indicator indicates the current passing between the first and second input/output circuits of the current regulating circuit.

The foregoing arrangement is quite important in relay testing as the apparatus is short-circuit-proof in all modes of operation.

BRIEF DESCRIPTION OF THE DRAWINGS

FIG. 1 is a pictorial view of a current flow test apparatus according to the present invention;

FIG. 2 is a simplified schematic and block diagram of the current flow test apparatus depicted in FIG. 1;

FIG. 4, comprising FIGS. 4A, 4B, 4C, 4D, 4E, and 4F, is a schematic diagram showing the details of a specific embodiment of the invention as depicted in FIG. 2; and FIGS. 5A, 5B, 5C, and 5D are pictorial diagrams depicting the circuit path through the current flow test apparatus of FIG. 4 with the various pushbuttons actuated which are indicated along the upper side of each of these figures.

DETAILED DESCRIPTION

Figure 3A:
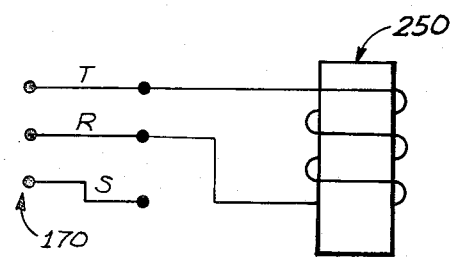
FIGS. 3A, 3B, 3C and 3D depict the basic circuit configurations under which relays are tested in accordance with the present invention.

Consider generally the current flow test set depicted pictorially in FIG. 1. Included is a set of three jacks 10. BATT jack 10-1 receives central office battery or other power supply source and jacks 10-2 and 10-3 are TEST and MEAS jacks which are used for test and measurement purposes, as explained in more detail hereinafter.

Depicted generally at 12 and 14 are six current control potentiometers 12-1 to 12-6 in association with six control switches 14-1 through 14-6. The control switch 14-6 is called the SOAK and when actuated, bypasses the range switches 18, placing the current flow test set in a 1000 MA range of operation. Each of the current control potentiometers 12 is adjusted to a specific current value desired for testing procedures. The six control switches 14 are not mechanically interconnected and should only be switched, one at a time. When switched, a control switch connects the correspondingly numbered current control potentiometer 12 into the apparatus so it can be used to adjust the current flowing between terminals of the TEST and MEAS jacks 10-2 and 10-3. Once the potentiometer is adjusted, a unique current regulating network (CRN) contained internally maintains the current independent of load. For example, the load may be a short circuit or a relay coil or some other resistive load. Additional details about the function and operation of the control potentiometers and the control switches in conjunction with the CRN will be described hereinafter.

Four range switches 18 are used for selecting the proper current or voltage range. Only one is actuated at any one time. The values 20, 100, 200 and 1000 shown below the switches 18 identify the milliamp current range or voltage range measured between terminals of the TEST or MEAS jacks when the corresponding switch is actuated. A voltage/current indicator 16 measures and indicates either current or voltage, depending on the mode setting in the range selected by the switches 18. A mode switch 23 is provided for controlling whether the indicator is connected for indicating voltage or current. The mode control switch 23 is connected to two buttons V and M which appear in FIG. 1 and place the switch 23 into one of two states. The button V switches switch 23 and hence the indicator 16 into a mode whereby it indicates volts, whereas the button M switches switch 23 and hence the indicator 16 to a state whereby it indicates current in milliamperes.

Four function switches 22 are depicted. The four function switches are selected depending on the external electrical circuit configuration under test. The switches are labeled GND, BATT, LP and MEAS. Only one of the switches 22 is actuated at a time and set up the internal circuit configuration of the current flow test set, depending on the external circuit configuration under test.

Two remaining switches 24 labeled REV and CO provide additional flexibility for the current flow test set. When the REV switch is actuated, the connections to the terminals of the TEST jack 10-2 are reversed. The CO or control switch is used to connect and disconnect the terminals of the TEST jack 10-2 from the rest of the circuitry in the test set.

Consider now the generalized schematic and block diagram of the current flow test set as depicted in FIG. 2. The three jacks 10-1, 10-3 and 10-2 are depicted, each with two connector terminals. The terminals of the TEST and MEAS jacks 10-2 and 10-3 bear the labels T and R, whereas the terminals of the BATT jack 10-1 bear the labels −48 V and GND (the latter two labels being chosen for ease of explanation) corresponding to the central office battery voltages which are connected to the two terminals of the BATT jack. The connector terminals T and R of the TEST jack 10-2 thereby form first and second current input/output circuits for the current flow test apparatus, whereas the −48V and GND terminals of the BATT jack 10-1 form first and second power input circuits for the current flow test apparatus.

The current regulating network or active current regulating circuit (CRN) is depicted at 26 and has a power supply input at 29 and 30 for receiving its power, first and second signal input/output circuits at 32 and 34, and a reference input circuit at 35 and 36. The CRN 26 uses a direct current (D.C.) power source isolated from the power input circuits at the terminals of the BATT jack 10-1 and is operative for regulating the level of current passing between the input/output circuits 32-34 (and hence between the T and R terminals of the TEST or BATT jack 10-2 and 10-3) to a constant level corresponding to the level of the signal applied between the reference input circuits 35 and 36.

A direct current to direct current (D.C. − D.C.) converter or power supply 28 has first and second input circuits 38 and 40 connected, respectively, to the −48 V and GND connector terminals of the BATT jack 10-1 for receiving power from telephone central office battery. The D.C. − D.C. converter 28 also has an output circuit including three output terminals 28-1, 28-2 and 28-3 to which are applied +, 0, and − DC power. The output terminals 28-1 (+) and 28-3 (−) are connected to the power supply input terminals 29 and 30, respectively, of the CRN 26. The 28-1 (+) and 28-2 (0) output terminals are connected for applying power across the control potentiometers 12-1 through 12-6. Significantly, the D.C. to D.C. converter 28 includes special circuitry for providing D.C. isolation in between its input and output circuits.

The side of the control potentiometers 12 connected to the 28-2 (0) output of the D.C. − D.C. converter is also connected to the line 36 of the CRN reference input circuit 35-36. The control switches 14-1 through 14-6, when actuated, connect the wiper arm of the corresponding control potentiometers 12-1 through 12-6 to the line 35 of the reference input circuit to the CRN 26. With this arrangement, one of the control potentiometers 12 is used to control the reference signal applied across the reference input circuit 35-36 of the CRN 26.

The function switches 22 are connected to the T and R connector terminals of the TEST jack 10-2 and to the −48 V and GND terminals of the BATT jack 10-1. The function switches 22 are a set of manually operable switching means for selectively coupling the input/output circuits 32 and 34 (34 is coupled via the MEAS switch 24) of the CRN 26, separately, to the connector terminals T and R of the TEST jack 10-2 and the −48 V and GND terminals of the BATT jack 10-1 in various combinations, depending on the circuit configuration of the relay under test.

In the various circuit configurations, the CRN 26 regulates the amount of current provided to the relay under test, depending on the setting of one of the control potentiometers 12. Thus, the control switches 14 and the potentiometers 12 form means for manually adjusting and setting the signal across reference input circuit 35–36 to a level which corresponds to the desired current which the CRN 26 is to supply between the input/output circuits 32 and 34.

The measure (MEAS) switch 22 is provided for connecting the input of the digital panel meter 18 either across the terminals of the MEAS jack 10-3, for measuring and indicating voltage, or in a series circuit with the input to the CRN 26 for measuring and indicating current.

Looking at the CRN 26 in more detail, it includes a controllable circuit or pass element in the form of a transistor 42. The pass transistor 42 has collector ($c$) and emitter ($e$) electrodes which form first and second input/output circuits coupled serially between the input/output circuits 32 and 34 of the CRN 26 and a base ($b$) electrode which forms a control circuit. The transistor 42 is responsive to signals applied to its base electrode for correspndingly regulating the amount of current passing between its collector and emitter circuits and hence between the input/ output circuits 32 and 34. In the CRN 26 a differential amplifier 44 has an output 44-3 connected to the base electrode of the transistor 42 and first and second differential inputs 44-2 and 44-1 coupled, respectively, to the emitter electrode of the transistor 42 and to one of the control potentiometers 12 via input line 35 and control switches 14.

The range switches 18 simultaneously connect one of a plurality of range resistors 46 in parallel with the meter 16 and connect one of a plurality of network shunt resistors 50 in series between the emitter of the transistor 42 and the reference input line 36. The value of the range resistor of 46 connected in parallel with the meter 18 and the value of the network shunt resistor of 50 connected in series with the emitter of transistor 42 depend on the one of range switches 18 which is actuated.

The amplifier 44 in the CRN 26 compares the voltage at its input 44-2 (caused by voltage drop across the network shunt resistor of 50 due to current flowing between terminals T and R of TEST jack 10-2) against a variable reference voltage signal applied at input 44-1 (by control switches 14 and potentiometers 12). The amplifier 44 regulates a signal at the base of transistor 42 so that sufficient current passes between input/output circuits 32 and 34 to balance the voltages applied between its inputs against the voltage drop across the range resistor 50.

It will be noted that the power supply inputs 29 and 30 are connected to the + and − power supply inputs of the amplifier 44. Significantly, then, the floating D.C. − D.C. converter, whose output is D.C. isolated with respect to its input, allows the whole CRN 26 to float relative to the central office battery connected to BATT jack 10-1 and hence allows many different relay circuit configurations to be tested.

Refer now to the detailed circuit diagram of the current flow test set as depicted in FIGS. 4A–4F.

BATT jack 10-1 (FIG. 4D) is a conventional 3 terminal jack having S and T terminals (for connection to ground and −48V, respectively) connected to lines 60 and 62 which, in turn, are connected to the M1 and M2 terminals of jack and plug J7/P7 to the D.C. to D.C. converter 28 (see FIG. 4A). The lines 60 and 62 are connected through a resistor 59 and a diode 61 to the opposite sides of a capacitor 68 which in turn has voltage divider resistors 70 and 72 connected thereacross. An inductor 64 is connected in series with diode 61. A capacitor 74 is connected in parallel with resistor 72. This circuit arrangement provides a filter circuit which forms essentially a D.C. power supply signal between the lines 76 and 78. Transistors 80 and 82, the diodes 84 and 86, and the resistors 88 and 90, in conjunction with a transformer 92, form an electronic chopper for converting the D.C. signal between lines 76 and 78 to a square wave rectified signal at the secondary side (terminals 10–15) of transformer 92. In this regard, when transistor 80 is conducting, transistor 82 is nonconductive and vice versa.

A full square wave rectifier circuit formed by diodes 94, 95, 96, and 97 are connected in a bridge circuit across secondary winding terminals 10 and 13 of the transformer 92 and apply a square wave signal of 20 volts peak-to-peak, between the lines 98 and 100. Capacitors 102 and 104 are serially connected together between the lines 98 and 100 to filter the signal between lines 98 and 100 and thereby provide a D.C. voltage signal between the lines 98 and 100. The junction between the capacitors 102 and 104 is designated 105 for convenience, but should not be confused with the line 60 connected to central office battery ground since the junction 105 is D.C. isolated from line 60 by transformer 92.

In summary, the secondary or right hand side of the transformer 92 is completely isolated from both of the power input lines 60 and 62 which are connected across telephone central office battery.

Voltage regulator 106 is of type SG 4501 sold by Silicon General Corp. The D.C. signal formed between lines 98 and 100 are supplied to input terminals 7 and 8 of the voltage regulator 106. Lines 108 and 110 are connected as indicated across the outputs at terminals 3, 4, and 5, and 10, 11 and 12 of the voltage regulator 106. Additionally, the output 1 of the voltage regulator 106 is connected to the ground junction 105. The voltage regulator 106 operates in a conventional fashion to apply a +15V D.C. signal on the line 108 and a −15V D.C. signal on the line 110 with respect to the ground junction 105.

The meter 16 (FIG. 4B) is a digital panel meter type AN2535-1-S made by Analogic Corp. A connector for the meter 16 is depicted at J8. The power input (+ and − PWR) terminals for the meter 16 are connected to power supply lines 110 and 112 from the D.C. − D.C. converter 28. The lines 110 and 112 are connected to a D.C. power supply formed by the full wave bridge rectifier diodes 114, 115, 116 and 117 which are powered between the terminals 14 and 15 of the secondary windings of the transformer 92. Filter capacitors 118 and 120 and inductor 122 filter the A.C. signal from the diode bridge forming the necessary D.C. signal for operating the meter 16. The operational amplifier 44 (FIG. 4A) is a differential type, model No. 741 sold by Signetics or Texas Instruments and has its power supply input lines 29 and 30 (see FIG. 2) connected to the power supply lines 108, and 110, respectively, from the D.C. − D.C. converter 28, which are isolated by transformer 92 from telephone central office battery.

Figure 4B:
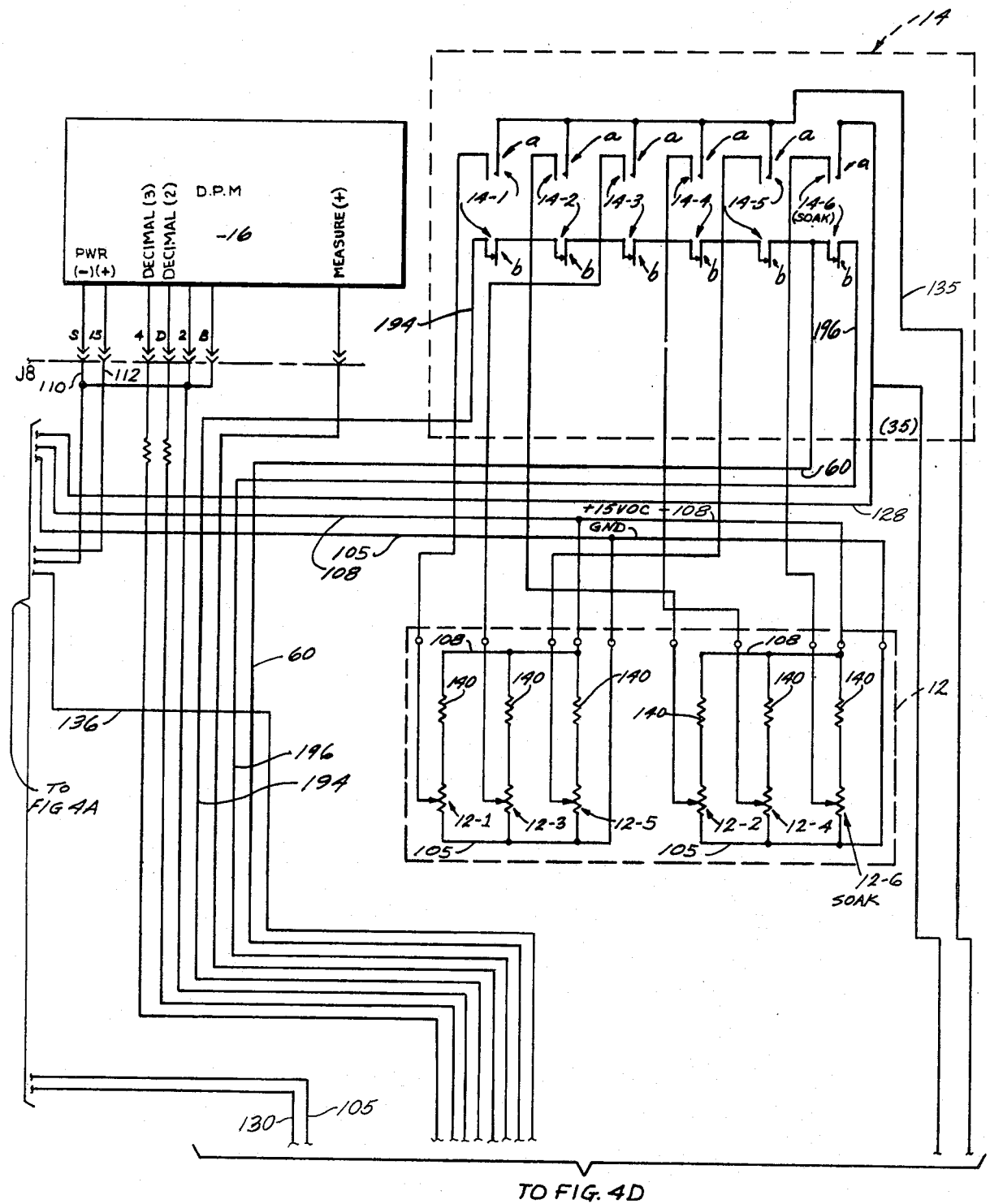

The non-inverting input side 44-1 of the operational amplifier 44 is connected through a high resistance current limiting resistor 124 to the line 128. The line 128, in turn, is connected via terminal M7 of jack and plug J7/P7 to one side of the normally closed contacts b of the SOAK relay 14-6 and to the normally closed contacts 20–21 of the RL-1 SOAK relay (FIG. 4C) to the line 135 which in turn is connected to one side of normally open contacts a of the control switches 14 (FIG. 4B). The line 135 corresponds to the reference input 35 of the CRN 26 shown in FIG. 2.

The inverting side 44-2 of the operational amplifier 44 is connected through a high resistance current limiting resistor 126 (same value as resistor 124) to a line 130 which, in turn, is connected through terminal M6 of jack and plug J7/P7, terminal B13 of jack and plug J6/P6 to the range switches 18 (FIG. 4C).

Transistors 132 and 133 (FIG. 4D) are connected together in a Darlington configuration and together correspond to the single pass transistor 42 (FIG. 1). The output 44-3 of the amplifier 44 is connected via line 136 and terminal M9 of jack and plug J7/P7 to the base electrode of the transistor 132. The emitter electrode of transistor 133 is connected via line 138 and terminal B14 of jack and plug J6/P6 to the range switches 18 (FIG. 4C). The switch contacts for the control switches 14 (FIG. 1) are shown schematically at 14-1 through 14-6 of FIG. 4. Included is one set of normally open contacts a and one set of normally closed contacts b for each of the switches 14-1 through 14-6. One side of each of the normally open contacts a for switches 14-1 through 14-5 is connected to the line 135. One side of the normally open contacts a for the SOAK switch 14-6 is connected to the line 135. The other side of the normally open contacts a are connected to the wiper arms of the corresponding one of the potentiometers of 12-1 through 12-6. In addition to the resistance of the potentiometers 14-1 through 14-6, a fixed resistor 140 is connected in series with each potentiometer. Each potentiometer and its corresponding fixed resistor are connected in series between the regulated positive voltage line 108 and the ground junction line 105. Thus the ground junction line 105 corresponds to line 36 in the input/output circuit for the CRN26 of FIG. 2.

The function switches GND, BATT, LP and MEAS depicted at 22 in FIG. 1 are designated in FIG. 4E as 22-GND, 22-BATT, 22-LP, and 22-MEAS, respectively. The mode switches REV and CO depicted at 24 in FIG. 1 are schematically depicted at 24-REV and 24-CO in FIG. 4E. The 20, 100, 200 and 1000 range switches depicted at 18 in FIG. 1 are designated 18-20, 18-100, 18-200 and 18-1000, respectively, in FIG. 4C to designate the current or voltage range of each.

When the mode switch 23 is actuated to the proper state by pushing mode control buttons V and M and one of the range switches 18 is actuated, the proper one of the range resistors 46 is connected across terminals 2, 13 and MEAS of the meter 16 and the proper network shunt resistor in 50 is connected in series with the emitter of the transistor 133. More specifically, when mode control button M is actuated, for a current mode of operation, the range resistor 46 connected across the meter terminals (2, 13 and MEASURE of the meter 16) consists of resistor 150 or resistor 151 or resistor 152 (FIG. 4C). When the mode control button V is actuated, causing a voltage mode of operation, when the range (attenuator) resistor 46 connected across the meter terminals (2, 3 and MEASURE of the meter 16) consists of resistor 153 together with resistor 154, 155 or together with resistor 156, 157. Also, when mode control button M is actuated for current mode, the network shunt resistor 50, which is connected in series with the emitter of transistor 133, consists of the resistor 160, or resistor 161, or resistor 162, or resistor 163. When the mode control button V is actuated for voltage mode, the network resistor 50, which is connected in series with the emitter of transistor 133, consists of resistor 160, or resistor 161, or resistor 162.

Consider now the possible relay test circuit configurations depicted in FIGS. 3A–3D and which are to be tested by the current flow test set depicted in FIGS. 1, 2 and 4. All of the jacks and plugs herein are of the type that when mated, the R and T terminals of the jack make electrical contact with the R and T terminals, respectively, of the plug. FIG. 3A depicts a conventional telephone jack plug 170 with T, R and S terminals which can be plugged into either of the TEST or MEAS jacks 10-2 and 10-3. A relay 250 having a single coil is depicted connected between the T and R terminals of plug 170. When the plug 170 is inserted into the TEST jack 10-2, a connection is made between the T and R terminals of the plug 170 and the T and R terminals, respectively, of the TEST jack 10-2. When testing a relay configuration such as that depicted in FIG. 3A where no external power is applied to the relay coil, the GND function switch 22 is actuated. With this configuration, the current flow test set applies central office battery from BATT jack 10-1 across the relay coil and regulates the amount of current (determined by one of the control potentiometers 12) passed through the relay coil.

Figure 3B:
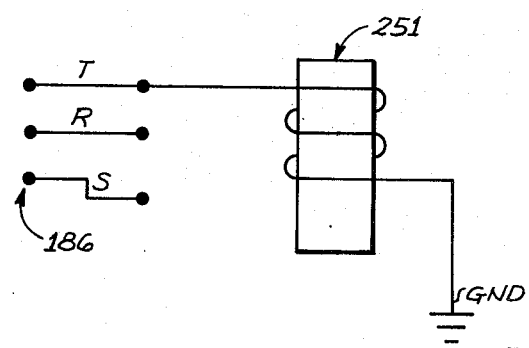

FIG. 3B depicts a plug 186 for insertion in the TEST jack 10-2 and a relay 251 having one end of its relay coil connected to the T terminal of plug 186 and the other side connected to the ground (GND) side of central office battery. The circuit configuration in FIG. 3B is tested by actuating the BATT switch and inserting the plug 186 into the TEST jack 10-2. With this arrangement, the current flow test set couples the −48 V side of the central office battery to the T terminals of the TEST jack 10-2 and plug 186 and regulates the amount of current (determined by one of the control potentiometers 12) passed through the relay coil.

Figure 3C:
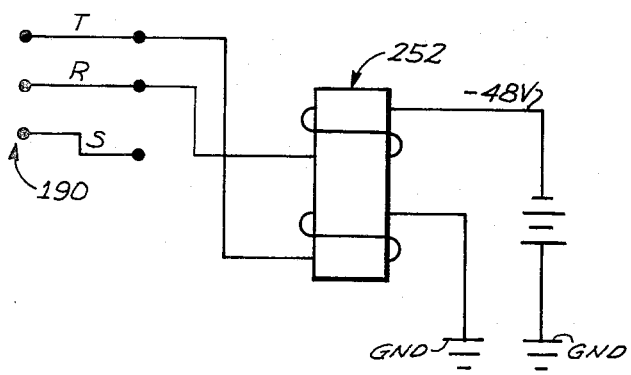

FIG. 3C depicts a plug 190 and a differential relay 252. The relay 252 has a first relay coil with one end connected to the R terminal of plug 190 and the other end connected to −48 V central office battery. The other coil of relay 252 has one end connected to the T terminal of plug 190 and the other end connected to the ground side of central office battery. The differential relay configuration depicted in FIG. 3C is tested by actuating the LP switch and inserting plug 190 into TEST jack 10-2. With this configuration, the T terminals of the TEST jack and plug are connected together and the R terminal of the TEST jack and the R terminal of the plug are connected together. The current flow test set regulates the amount of current (determined by one of the control potentiometers 12) passed between the terminals of the TEST jack 10-2 and hence serially through the two coils of relay 252.

Figure 3D:
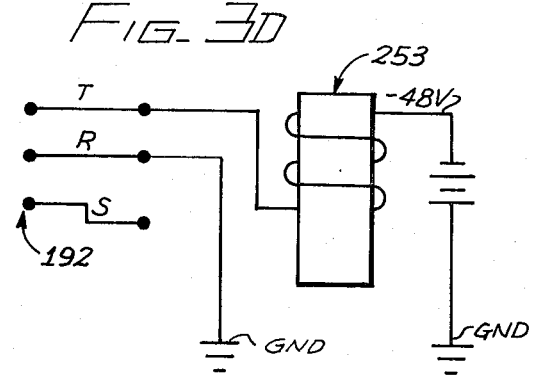

FIG. 3D depicts a plug 192 and a relay 253 with its relay coil connected between the T terminal of plug 192 and −48 V central office battery. The R terminal of plug 192 is connected directly to central office battery ground. The same circuit configuration of the current flow test set used for FIG. 3C with the LP switch actuated can be used for testing the circuit configuration of FIG. 3D.

Consider now an example of the operation of the circuit in FIG. 1, making reference to the schematic representations in FIGS. 5A through 5D. FIG. 4A–F shows all switches 18, 22 and 24 with their middle contacts in an up or a deactuated condition. When any switch is actuated, its middle contact goes to the down position. The mode switch 23 is shown with the V (volts) button actuated, causing the middle contacts to be up and hence in a voltage mode. When the M (milliamp) button is actuated, the middle contacts of mode switch 23 are down and hence in a current (milliampere) mode of operation.

Figure 5A:
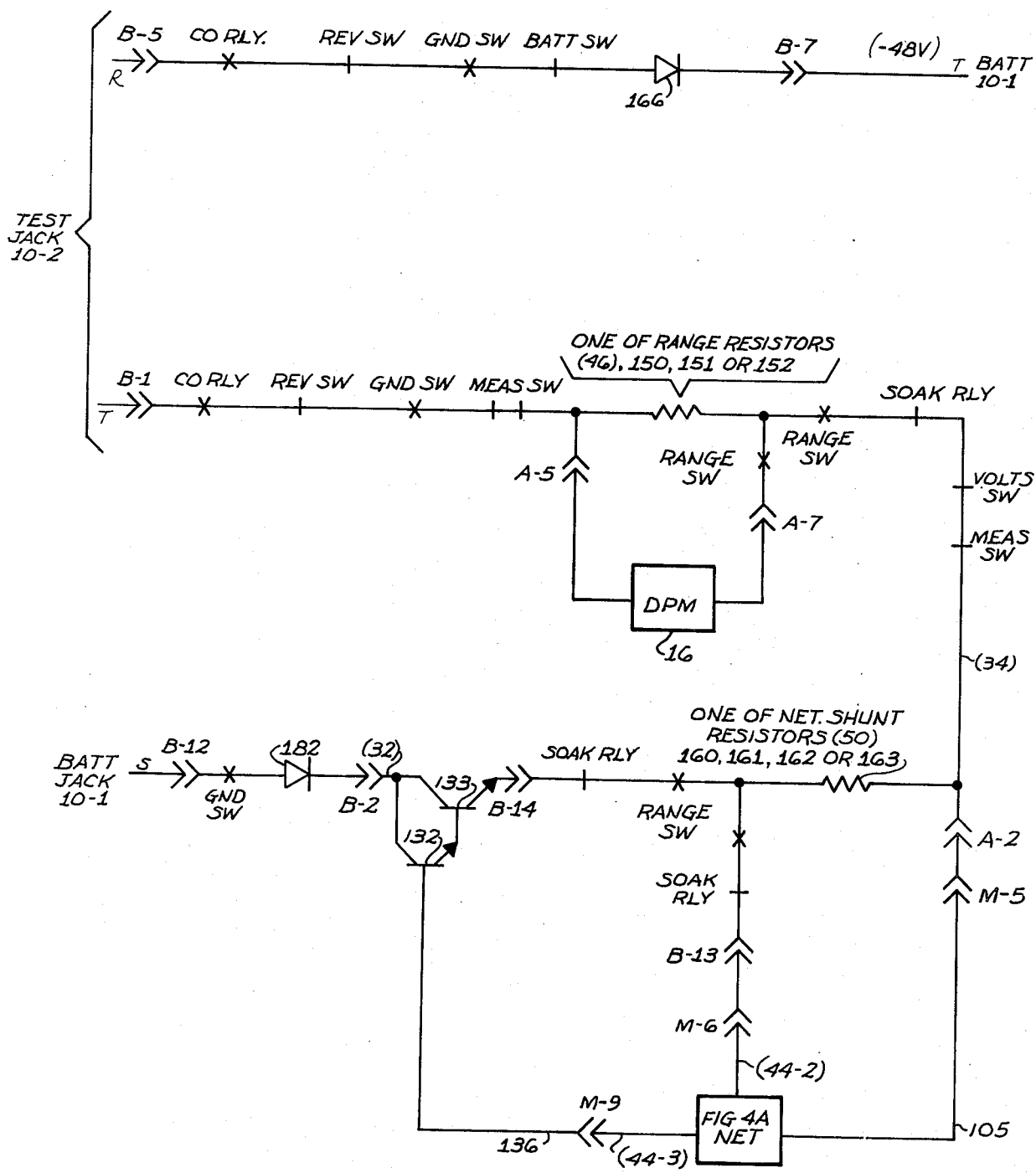

FIG. 5A depicts the switch configuration for the current flow test set assuming that the GND mode switch 22 is actuated, the mode control button M is actuated and range switch 18–1000 is actuated. In this configuration, the current flow test set is designed to check the operation of a relay in the circuit configuration of FIG. 3A. Assume for purposes of explanation that range switch 18–200 is actuated, thereby changing the position of its middle contacts 2, 5, 8, 11, 14 and 17 from that indicated in FIG. 4 to a downward position. Referring to FIG. 5A, the TEST jack 10-2 has its R terminal connected to the −48 V central office battery via the terminal of BATT jack 10-1, whereas the T terminal of TEST jack 10-2 is connected through the indicated circuitry to GND via the S terminal of the BATT jack 10-1.

Considering the connections in more detail, a transistor relay driver 192 initially has both of its control inputs at lines 186 and 194 connected to the GND input from the central office battery. As a result, a relay driver 192 is de-energized, thereby disconnecting any power from across terminals 4 and 1, respectively, of CO-RL-2 relay (FIG. 4-F). Under these conditions, the terminals of the TEST jack 10-2 are open circuit by virtue of normally open contacts 7 and 10 (as shown) of CO-RL-2 relay. Assume now that control switch 14-1 (corresponding to potentiometer 12-1) is actuated, opening its contacts b and closing its contacts a. The opening of contacts b opens the connection of line 194 from the GND line 60, causing relay driver 192 to turn on and apply across relay coil terminals 4 and 1, GND and −48 V power via line 186 (connected to line 60) and line 62 (through diode 166), respectively. As a result relay CO-RL-2 is energized and its normally open contacts 9–10 and 6–7 close. The closure of contacts 9–10 and 6–7 connect the TEST jack terminals R and T through the normally closed contacts 1–2 and 5–4 of the switch 24-REV to lines 191 and 192. The line 191 (from the R terminal of TEST jack 10-2) is connected to the −48V terminal T of BATT jack 10-1 via the normally open contacts 8–9 of the switch 22-GND, the normally closed contacts 1–2 of the switch 22-BATT, the polarity restricting diode 166, connector terminal B7 of jack and plug J6/P6 and the −48 V line 62.

Consider now the connection for terminal T of the TEST jack 10-2. The line 192 (from the T terminal of TEST jack 10-2) is connected to the GND terminal S of BATT jack 10-1 via the normally open contacts 3-2 of the switch 22-GND, the normally closed contacts 2-1 and 7-8 of the switch 22-MEAS and line 168 which is connected to one side range resistor 151. Line 168 is also connected through terminal A5 of jack and plug J5/P5 to terminals 2 and B for the meter 16, thus providing one signal input for meter 16.

Line 168 is also connected through the range resistor 151 to line 170. Line 170 is connected to the 0 volts line 105 of the network depicted in FIG. 4A via the normally closed contacts 18-17 of the SOAK relay RL-1, line 174, the closed contacts 16-17 of the switch 23, the normally closed contacts 5-4 of switch 22-MEAS, terminals A 2 of jack and plug J5/P5, and terminal M5 of jack and plug J7/P7. It will also be noted that the DC-DC converter 28 ground junction line 105 is connected to one side of the network shunt resistor 161 via terminal M5 of jack and plug J7/P7 and terminal 2 of jack and plug J7/P7. Accordingly, a connection is made through the network shunt resistor 161 to the emitter of transistor 133 via normally open contacts 9-8 of range switch 18-100, to line 180, normally closed contacts 11-12 of the SOAK RL-1 relay, terminal B14 of jack and plug J6/P6. Additionally, line 178, connected to the one side of network shunt resistor 161, is connected to the input 44-2 of the amplifier 44 via the normally open contacts 9-8 of the range switch 18-100, normally closed contacts 8-9 of the SOAK RL-1 relay, terminal B13 of jack and plug J6/P6, terminal M6 of jack and plug J7/P7 and resistor 126.

The collector electrodes of transistors 132 and 133 are connected to the GND terminals of the BATT jack 10-1 via the terminal B2 of jack and plug J6/P6, the polarity restricting diode 182, the normally open contacts 6-5 of the function switch 22-GND, line 186, terminal B12 of jack and plug J6/P6.

Although the above example was given for the range switch 18-100 being actuated, thereby causing network shunt resistor 161 and range resistor 151 to be used, it will be noted that with the range switch 18-20 actuated, that network shunt resistor 160 and range resistor 150 is used or with the range switch 18-200 actuated, that network shunt resistor 162 and range resistor 151 is used, or with the range switch 18-1000 actuated, that network shunt resistor 163 and range resistor 152 is used. It is important to note that one and only one of the range switches 18 is actuated at any time, and as a result, the proper combination of network shunt resistor and range resistor is selected for the current or voltage range corresponding to the switch which is actuated.

Figure 5B:
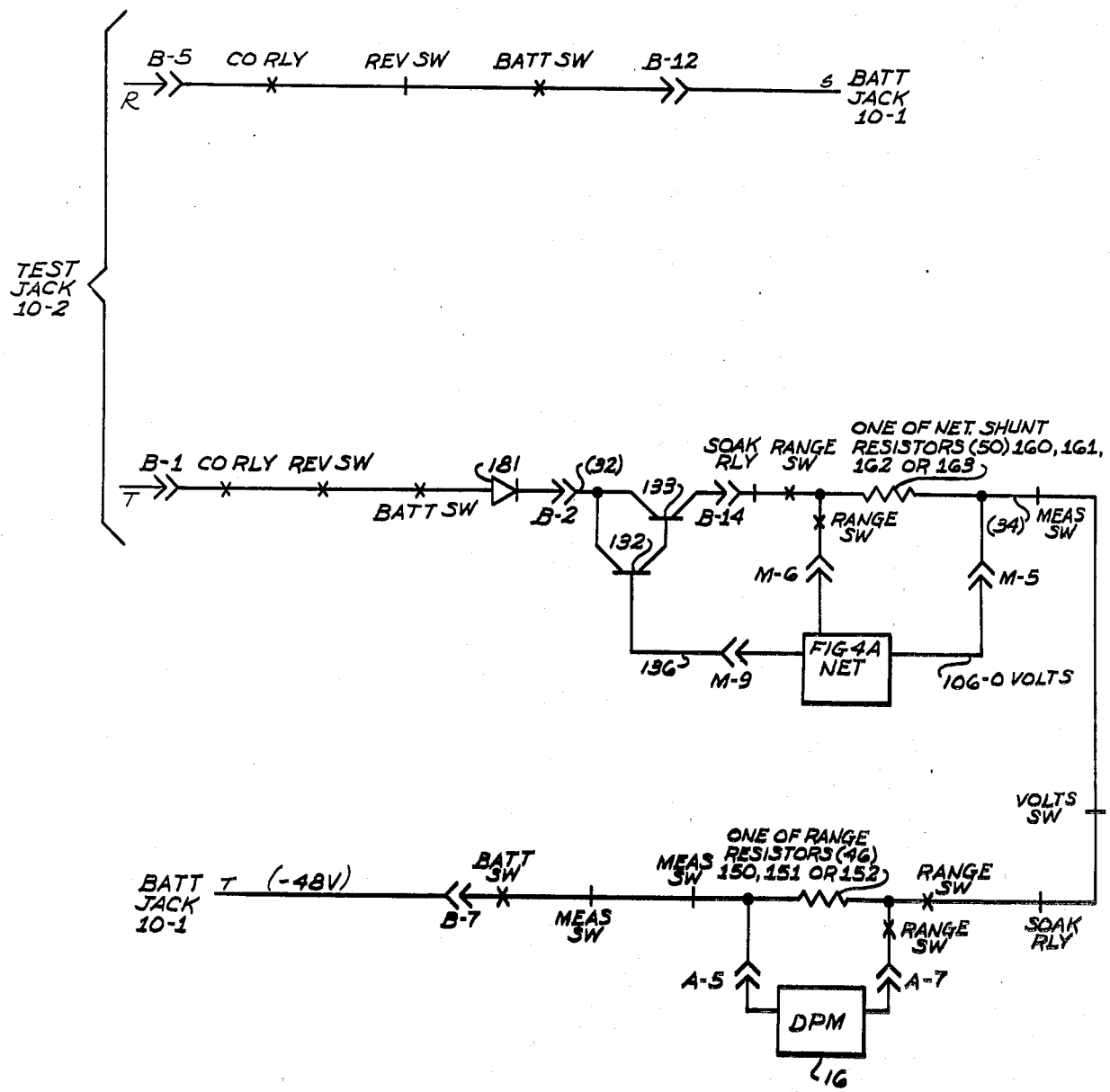

FIG. 5B shows a schematic for the connections of the current flow test set when the mode control button M, switch BATT and one range switch are actuated. The purpose of actuating the BATT function switch 22 is to test a relay in a circuit configuration such as is depicted in FIG. 3B where one side of the relay coil is connected to central office battery GND and the other side is open. With the M button actuated, the middle contacts of the switch 23 are down.

Consider now the other possible internal connections for the current flow test set. With the switch BATT-22 actuated, its middle contacts 2, 5 and 8 are down, whereas the middle contacts of the other function switches are up. As a result, the function switches 22 establish the circuit paths depicted schematically in FIG. 5B. Specifically, the TEST jack 10-2 has its R terminal connected to the S terminal (GND) of the BATT jack 10-1 and the T terminal of the TEST jack 10-2 is connected to the T (−48 V) terminal of the BATT jack 10-1 via the Darlington connected transistors 132, 133, one of the net shunt resistors 50 and one of the range resistors (connected in parallel with the meter 16).

Figure 5C:
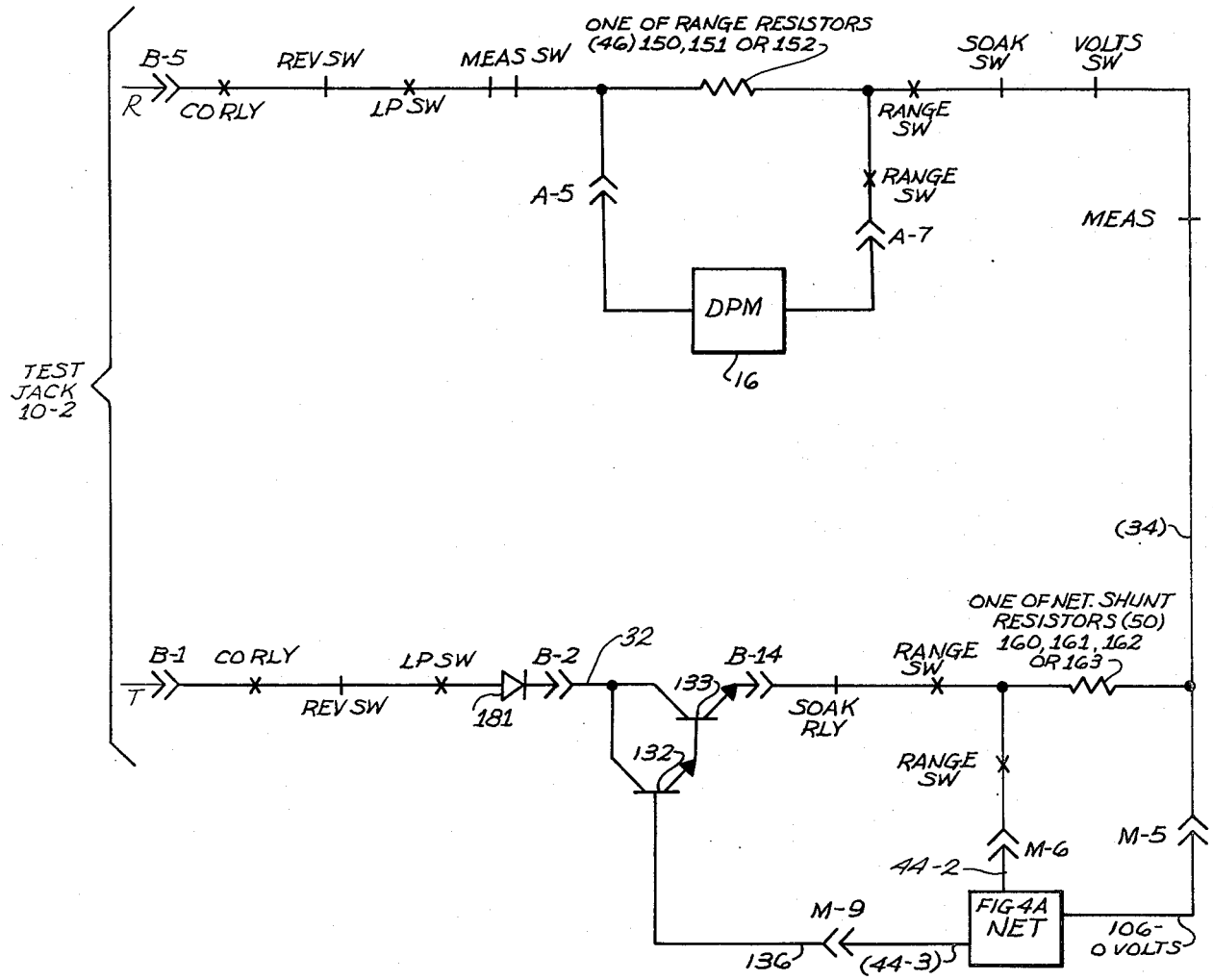

FIG. 5C shows a schematic representation of the current flow test set wherein the mode control button M, the switch, LP and one of the range switches 18 are actuated for testing a differential relay configuration such as that depicted in FIG. 3C. With the M button and the LP switch actuated, the middle contacts 2, 5, 8, 11, 14 and 17 of the mode switch 23 are down, the middle contacts 2 and 5 of the switch 22-LP are down, (whereas the middle contacts of the other function switches 22 are up) and the middle contacts of the actuated range switch 18 are down. Under these conditions, the function switches 22 cause the R terminal of the TEST jack 10-2 to be connected to the T terminal of TEST jack 10-2 via the parallel connection of one of the range resistors 46 and the meter 16, one of the network shunt resistors 50 and the Darlington connected transistors 132, 133.

The middle contacts of the switch 22-LP are down, whereas the middle contact of the other function switches 22 are up and the middle contact of one of the range switches 18 are down. Under these conditions, the function switches 22 cause the R terminal of the TEST jack 10-2 to be connected to the T terminal of the TEST jack 10-2 via the parallel connection of one of the range resistors 46 and the meter 16, one of the network shunt resistors 50 and the Darlington connected transistors 132, 133.

FIG. 5D depicts the connection on the current flow test set under the condition wherein the mode control button V, the switch 22-MEAS, one of the range switches 18 and the switch 22-GND are actuated. Under these conditions, the meter 16 is connected in parallel with the range resistor 153 and one of the range resistor pair 155 and 156 or 167 and are connected in series with resistor 153 and in between the R and T terminals of the MEAS jack 10-3. As a result, the meter circuit 16 is connected in a separate circuit (between terminals of the MEAS jack 10-3) from the rest of the circuitry, allowing it to be used as a milliampmeter or a voltmeter. With the switch GND-22 actuated, the R terminal of the TEST jack 10-2 is connected to the T terminal of the BATT jack 10-1 (−48V central office battery) and the T terminal of the TEST jack 10-2 is connected to the S terminal of the BATT jack 10-1 (ground side of central office battery) via one of the network shunt resistors 50 and the Darlington connected transistors 132 and 133.

With the function switch 22-MEAS actuated, other configurations of the network shunt resistors 50 and the Darlington connected transistors 132, 133 can be achieved still having the meter 16 connected between the R and T terminals of the MEAS jack 10-3 as depicted in FIG. 5D. Thus with the switch 22-BATT actuated, the connection of the T and S terminals of the BATT jack 10-1 depicted in FIG. 5D reverse. With the switch 22-LP depressed in combination with the switch 22-MEAS a connection is established by the function switches via a series connected network shunt resistor 50 and the Darlington connected transistors 132, 133 between the T and R terminals of the TEST jack 10-2.

Although an exemplary embodiment of the invention has been disclosed for purposes of illustration, it will be understood that various changes, modifications and substitutions may be incorporated in such embodiment without departing from the spirit of the invention as defined by the claims appearing hereinafter.

What is claimed is:

1. Current flow test apparatus comprising:
   a. first and second current input/output circuits for the test apparatus;
   b. first and second power input circuits for the test apparatus;
   c. an active current regulating circuit comprising a power supply input for receiving power therefor, first and second signal input/output circuits and a reference input, the regulating circuit having a D.C. isolation from the power input circuits and operative for regulating the level of current passing between the input/output circuits of the regulating circuit to a contant level corresponding to the level of the signal applied at said reference input;
   d. a power supply having first and second input circuits, respectively, connected to said first and second power input circuits for receiving power and an output circuit coupled to the power supply input of said regulating circuit, said power supply providing electrical power to said regulating circuit and comprising means for providing a D.C. isolation between the output and input circuits of said power supply;
   e. manually operable function switching means for selectively coupling the first and second input/output circuits of the regulating circuit, separately, to the first and second power input circuits and the first and second current input/output circuits of the test apparatus, in various combinations;
   f. manually adjustable means for setting the signal at the reference input to various levels; and
   g. a visual indicator for indicating current passing through said first and second input/output circuits of said current regulating circuit.

2. Current flow test apparatus according to claim 1 wherein said current regulating circuit comprises:
   a. controllable circuit having first and second input/output circuits coupled serially between the first and second input/output circuits of said regulating circuit and a control circuit, the controllable circuit being responsive to signals at its control circuit for regulating the amount of current passing between its first and second input/output circuits; and
   b. differential amplifier means having an output coupled to the control circuit and first and second input circuits one of which is coupled to one of the input/output circuits of said controllable circuit and the other of which is coupled to said reference input.

3. Current flow test apparatus according to claim 2 wherein said differential amplifier means has an input for receiving power coupled to said power supply output circuit.

4. Current flow test apparatus according to claim 1 wherein said manually adjustable means comprises at least one voltage divider circuit coupled across the output circuit of said power supply.

5. Current flow test apparatus according to claim 1 wherein said visual indicator has at least first and second input/output circuits for receiving signals to be indicated thereby and means for coupling the input/output circuits of the indicator into series circuit relation with said input-output circuits of said current regulating circuit.

6. Current flow test apparatus according to claim 5 wherein said coupling means for said indicator comprises a manually operable switch for selectively coupling the input/output circuits of said indicator into series circuit relation with said input/output circuits of said regulating circuit.

7. Current flow test apparatus according to claim 5 comprising:
   a. a first plurality of range resistor means for said regulating circuit;
   b. a second plurality of range resistor means for said indicator; and
   c. manually operable range switch means having a plurality of states, each state for coupling a selected one of the first resistor means in series circuit relation with the input/output circuits of both the regulating circuit and indicator, and each state for further coupling a selected one of the second resistor means in parallel circuit relation across the input/output circuits of the indicator.

8. Current flow test apparatus comprising:
   a. first and second current input/output circuits for the test apparatus;
   b. first and second power input circuits for the test apparatus;
   c. an active current regulating circuit comprising a power supply input for receiving power therefor, first and second signal input/output circuits and a reference input, the regulating circuit being responsive to the level of a signal at said reference input for regulating proportionately the level of current passing between the input/output circuits of the regulating circuit;
   d. manually adjustable means for setting the signal at the reference input to various levels;
   e. a power supply having first and second input circuits, respectively, connected to said first and second power input circuits for receiving power and an output circuit coupled to the power supply input of said regulating circuit, said power supply providing electrical power to said regulating circuit and comprising means for providing a D.C. isolation between the output and input circuits of said power supply;
   f. function switching means comprising
      1. first switching means for coupling the the first and second input/output circuits of said regulating circuit, respectively, to the second power input circuit and to the first current input/output circuit, and for coupling the second current input/output ciruit to the first power input circuit;
      2. second switching means for coupling the first and second input/output circuits of said regulating circuit, respectively, to the first current input/output circuit and to the first power input circuit, and for coupling the second current input/output circuit to the second power input circuit, and
      3. third switching means for coupling the first and second input/output circuits of said regulating circuit, respectively, to the first current input/output circuit and to the second current input/output circuit of the test apparatus;
   g. a visual indicator for indicating current passing through said first and second input/output circuits of said current regulating circuit.

9. Current flow test apparatus according to claim 8 wherein said current regulating circuit comprises:
   a. controllable circuit having first and second input/output circuits coupled serially between the first and second input/output circuits of said regulating circuit and a control circuit, the controllable circuit being responsive to signals at its control circuit for regulating the amount of current passing between its first and second input/output circuits; and
   b. differential amplifier means having an output coupled to the control circuit and first and second input circuits one of which is coupled to one of the input/output circuits of said controllable circuit and the other of which is coupled to said reference input.

10. Current flow test apparatus according to claim 9 wherein said differential amplifier means comprises an input for receiving power coupled to said power supply output circuit.

11. Current flow test apparatus according to claim 8 wherein said manually adjustable means comprises at least one voltage divider circuit coupled across the output circuit of said power supply.

12. Current flow test apparatus according to claim 8 wherein said visual indicator has at least first and second input/output circuits for receiving signals to be indicated thereby and means for coupling the input/output circuits of the indicator into series circuit relation with said input/output circuits of said current regulating circuit.

13. Current flow test apparatus according to claim 12 wherein said coupling means for said indicator comprises a manually operable switch for selectively coupling the input/output circuits of said indicator into series circuit relation with said input/output circuits of said regulating circuit.

14. Current flow test apparatus according to claim 12 comprising:
   a. a first plurality of range resistor means for said regulating circuit;
   b. a second plurality of range resistor means for said indicator; and
   c. manually operable range switch means having a plurality of states, each state for coupling a selected one of the first resistor means in series circuit relation with the input/output circuits of both the regulating circuit and indicator, and each state for further coupling a selected one of the second resistor means in parallel circuit relation across the input/output circuits of the indicator.

15. Current flow test apparatus comprising:
   a. a test connector having first and second test terminal connectors;
   b. a power connector having first and second power terminal connectors;
   c. an active current regulating circuit comprising a power supply input for receiving power therefor, first and second signal input/output circuits and a reference input, the regulating circuit being responsive to the level of a signal at said reference input for regulating proportionately the level of current passing between the input/output circuits of the regulating circuit;
   d. manually adjustable means for setting the signal at the reference input to various levels;
   e. power supply having first and second input circuits, respectively, connected to said first and second power terminal connectors for receiving power, and an output circuit coupled to the power supply input of said regulating circuit, said power supply providing electrical power to said regulating circuit and comprising means for providing a D.C. isolation between the output and input circuits of said power supply;

f. manually operable function switching means comprising 1. first switching means for coupling the first and second input/output circuits of said regulating circuit, respectively, to the second power terminal connector and to the first test terminal connector, and for coupling the second test terminal to the first power terminal connector, 2. second switching means for coupling the first and second input/output circuits of said regulating circuit, respectively, to the first test terminal connector and to the first power terminal connector and for coupling the second test terminal to the second power terminal connector, and 3. third switching means for coupling the first and second input/output circuits of said regulating circuit, respectively, to the first test terminal connector and to the second test terminal connector;

g. a visual indicator for indicating current passing through said first and second input/output circuits of said current regulating circuit.

* * * * *